United States Patent [19]
Dragner et al.

[11] Patent Number: 5,494,555
[45] Date of Patent: Feb. 27, 1996

[54] METHOD OF MODIFYING THE OPACITY OF PAPER AND PAPER PRODUCED THEREFROM

[75] Inventors: Louis R. Dragner; Bernard F. North, both of Rock Hill, S.C.

[73] Assignee: Sequa Chemicals, Inc., Chester, S.C.

[21] Appl. No.: 440,245

[22] Filed: May 12, 1995

Related U.S. Application Data

[62] Division of Ser. No. 300,175, Sep. 2, 1994.

[51] Int. Cl.$^6$ .......................... D21H 17/00; D21H 17/07; D21H 17/15
[52] U.S. Cl. ...................... 162/164.6; 162/166; 162/179; 162/167
[58] Field of Search ................................ 162/164.6, 166, 162/167, 158, 179

[56] References Cited

U.S. PATENT DOCUMENTS

| | | | |
|---|---|---|---|
| 2,142,986 | 1/1939 | Arnold, Jr. | 162/172 |
| 3,014,836 | 12/1961 | Proctor, Jr. | 162/181.8 |
| 3,096,232 | 7/1963 | Chapman | 162/172 |
| 4,060,507 | 11/1977 | Floyd et al. | 260/21 |
| 4,625,029 | 11/1986 | Floyd et al. | 544/309 |
| 4,826,536 | 5/1989 | Raythatha et al. | 106/465 |
| 5,292,363 | 3/1994 | Hutcheson | 106/243 |
| 5,296,024 | 3/1994 | Hutcheson | 106/243 |

*Primary Examiner*—David L. Lacey
*Assistant Examiner*—Jose A. Fortuna
*Attorney, Agent, or Firm*—Mitchell D. Bittman

[57] ABSTRACT

A method of enhancing the opacity of paper and paper of enhanced opaqueness is provided wherein a reaction product of fatty acid, diamine and a glyoxal product an further including a surfactant, is added to a slurry of cellulose fibers in a papermaking process.

24 Claims, No Drawings

METHOD OF MODIFYING THE OPACITY OF PAPER AND PAPER PRODUCED THEREFROM

This is a division of application Ser. No. 08/300,175, filed Sep. 2, 1994.

FIELD OF THE INVENTION

This invention relates to compositions for use in the papermaking process, a papermaking process employing the compositions to add opaqueness to the paper, and a paper produced using the compositions.

BACKGROUND OF THE INVENTION

The quality of paper produced from cellulose fibers (i.e. wood pulp or the paper produced by the recycling of such paper) is often judged by its opacity. Paper producers have long sought to improve opacity so that an enhanced paper may be obtained.

This and other desired characteristics have been obtained in the past by supplying the pulp slurry of cellulose fibers or furnish with additives prior to the slurry entering the papermaking machine. Various additives are well known in the art. For example, titanium dioxide powder is known to be an excellent whitener Titanium dioxide, however, is among the most expensive materials that may be added to the slurry. Thus, despite the effectiveness of such material as a brightener, its use is limited and satisfactory replacements have been needed.

Kaolin clay has also been used as a filler in paper to improve brightness in the ultimate product. Generally, the kaolin clay is calcined and then suspended in an aqueous solution prior to being added to the furnish. The clay must be continuously agitated prior to entering the slurry or the solid particles begin to form sediment at the bottoms of the clay holding tanks. Although kaolin clay provides brightness, as well as opacity to the finished paper product, the relative difficulty of adding it to the slurry is a drawback.

When clay is added to the pulp slurry, the slurry needs additional chemicals. A retention aid is necessary to retain the clay in the sheet which will add extra cost to the sheet. Adding clay to the slurry will also have an adverse effect on drying the sheet of paper. The paper maker will slow the paper machine down to maximize the drying to make sure the sheet is dried which will increase the cost of the sheet. The clay also increases wear on the paper machine. This wear shows up in shorter life for some of the parts of the paper machine. The wire, felt, doctor blade and refiners especially, show wear when clay is used. With the increased abrasiveness of the clay down time is longer and more frequent. Such kaolin-containing products are described in U.S. Pat. No. 3,014,836 to Proctor, Jr. and U.S. Pat. No. 4,826,536 to Raythatha et al.

Hydrated aluminum silicate has also been employed as a clay substitute in the papermaking process. It has properties similar to kaolin clay and, thus, results in the same disadvantages when used to make paper.

Many compositions have been added to the slurry in an attempt to size the paper, i.e. add body to the paper and render the paper water repellent or waterproof. Most know sizes, such as those disclosed in U.S. Pat. No. 2,142,986 to Arnold, Jr. and U.S. Pat. No. 3,096,232 to Chapman, employ a type of wax. For example, Arnold, Jr. discloses that an emulsion of wax in a solution of deacetylated chitin, paraffin waxes, Japan wax, carnauba wax, higher aliphatic alcohols, or synthetic waxes may be employed as the waterproofing agent in a sizing composition. A softening agent such as aliphatic alcohols containing 12 to 20 carbons is also present in the composition of Arnold, Jr. Chapman discloses the use of paraffin waxes or water-insoluble derivatives of resins for producing aqueous wax emulsions with cationic modified starches.

In U.S. Pat. Nos. 5,296,024 and 5,296,363 a papermaking composition is disclosed for enhancing opaqueness comprising the reaction product of fatty acid and diamine. This composition is effective although there is a desire to improve the brightness and strength of the paper produced.

SUMMARY OF THE INVENTION

It is an object of the present invention to provide a composition for adding to paper during the papermaking process so that the resulting paper has enhanced characteristics.

It is another object of the present invention to provide a composition that adds opacity to paper to which it is added.

Another object of the present invention is to provide a composition for opacifying a paper while improving the brightness and strength of the paper produced.

Still another object of the present invention is to provide a process for adding a composition to pulp slurry of cellulosic fibers in the papermaking process that will result in a paper having enhanced opacity.

Yet another object of the present invention is to provide a paper having the desirable characteristics of enhanced opacity.

Generally speaking, the present invention is directed to a composition used as an additive to the pulp slurry of cellulose fibers from which paper is formed, the process of making paper from the additive-containing slurry, and the paper made according to that process. The composition contains the reaction products of fatty acid and diamine to which a glyoxal compound is added, wherein the composition further includes a surfactant. In addition the following may be added to the composition: an acid to adjust pH, a salt to adjust viscosity, and a defoamer to control them. In a preferred embodiment the reaction products of fatty acid and diamine are further reacted with the glyoxal compound.

DETAILED DESCRIPTION OF THE INVENTION

The composition of this invention is added to the pulp slurry after the wood pulp has been bleached to remove lignin and other undesirables and de-inked, if recycled paper pulp is being used, but before the pulp enters into the headbox of a papermaking machine. The composition may be added alone, or in conjunction with other brighteners, opacifying agents, and sizes. For example, in one embodiment of the invention, the composition hereof may be added in conjunction with papermaking clays such as kaolin or in conjunction with a brightness and opacifying agent based on the stearic acid diamide of amino ethyl ethanolamine.

The composition may be added to any pulp slurry of cellulose fibers to obtain the desired physical characteristics and is especially useful for enhancing the characteristics of paper made from the recycled pulp of cellulose fibers. The amount of composition, as well as the amounts of each component in the composition, will vary depending on the characteristics and types of pulp slurry to which the composition is added. As is well known, different sources of wood pulp have different peculiarities that attribute to their ability to be brightened, made more opaque and more water resistant, and easily processed. For instance, some wood pulp requires a higher concentration of brightening and opacifying agents than others to produce a finished paper product having identical characteristics.

The composition employed in the present invention comprises the reaction products formed from the reaction of fatty acid and dime, to which a glyoxal compound is added and wherein the composition further includes a surfactant. In a preferred composition the reaction products of fatty acid and diamine is further reacted with the glyoxal compound. This composition provides an increase in opacity to the paper produced and an increase in the brightness and strength of the paper as compared to a reaction product of fatty acid and diamine where no glyoxal is added.

The fatty acid utilized in the composition preferably is a long chain fatty acid having between 12 and 18 carbons. Suitable fatty acids include lauric acid, myristic acid, isostearic and palmitic acid with the preferred acid being stearic acid. The fatty acids can also include the hydroxy substituted and/or the unsaturated fatty acids including ricinoleic acid, oleic acid, linoleic acid, linolenic acid and eleostearic acid.

The diamine utilized in the composition is preferably an alkanoldiamine, preferably amino ethyl ethanol amine. Other suitable diamines include amino propyl ethanol amine, amino ethyl propanol amine and amino propyl propanol amine. The diamine preferably has an amine number of less than 2000 mg KOH/gm and a boiling point greater than 120° C.

As used herein, the term "glyoxal compound" includes not only glyoxal but also derivatives thereof including blocked glyoxal resins. Suitable blocked glyoxal resins which may be used in accordance with the invention are described in U.S. Pat. No. 4,695,606 and include but are not limited to cyclic urea/glyoxal/polyol condensates, polyol/glyoxal condensates, urea or cyclic urea/glyoxal condensates, and glycol/glyoxal condensates. The glyoxal compound when added to, preferably reacted with, the reaction product of fatty acid and alkanoldiamine has been found to increase the brightness and strength in the paper over a composition prepared by reacting fatty acid with alkanoldiamine without glyoxal addition.

The composition generally comprises 70 to 90, preferably 80 to 85%, by weight of fatty acid and 10 to 30%, preferably 15 to 20%, by weight of alkanoldiamine which are first reacted together. Then this reaction product base is preferably neutralized to a pH range of 4 to 8. This is generally carried out by the addition of an acid, preferably an organic acid such as acetic acid, propionic, butync or formic. The glyoxal compound is added and preferably reacted with the reaction product base at a level of generally 3 to 35%, preferably 5 to 25% of glyoxal by weight of the base.

The composition is emulsified to prepare an emulsion suitable for addition to the paper pulp by addition of generally 58 to 30%, preferably 10 to 20% of the reaction product to 0.1 to 0.5% preferably 0.2 to 0.4% surfactant and optimally 0.1 to 0.5. preferably 0.2 to 0.4% inorganic salt and 70 to 95%, preferably 80 to 90% water.

The composition can be prepared as follows. Stearic acid is charged to a resin flask equipped with an agitator, nitrogen sparge tube and a thermometer and heated to less than 150° C., preferably not exceeding 130° C. After a homogeneous solution is achieved the amino ethyl ethanol amine is added slowly with an addition funnel at a temperature not exceeding 150° C. The mixture of the acid and amine will exotherm. This exotherm can be controlled by external cooling or by the rate of addition of the amine. After the amine charge is completed the batch temperature is slowly increased to 180° C. to 230° C. The reaction will foam when the water of reaction starts to distill at 150° C. This foaming may be controlled by an anti foam agent. The acid value is measured when the temperature is at 180° C. to 200° C. If the acid value is less than 7 mg KOH/gm of sample, then batch can be cooled, if the acid value is greater than 7 cooking is continued until an acid value of less than 7 is achieved.

The fatty amide of amino ethyl ethanol amine is then heated to 70° to 95° C. in a reaction vessel equipped with a stirrer and an inert gas sparge. When all the base is in a liquid form glacial acetic acid is charged. The solution may exotherm but is maintained below 95° C. The neutralized base at a pH of 6.5 is left to mix for 30 to 60 minutes. The temperature is stabilized at 77° C. to 90° C. and glyoxal is added over a 5 to 30 minute period and the batch is held for an additional 30 minutes to ensure the reaction is complete. The final product melted at 60° to 70° C. The reaction product was added to a reaction vessel equipped with an agitator and thermometer. The reaction vessel contained water, ethylene oxide surfactant, and sodium acetate. The mixture was heated to 93° C. and held between 91° C. to 95° C. for 45 minutes. The emulsion was cooled to 30° C. and the pH was adjusted to 4 to 5 with acetic acid and the solids were adjusted with water to 11%.

It is preferred that the particle size of the opacifier composition base be as small as possible. The reaction product made according to Example I herein is a solid substance. In order for the composition to remain in an emulsified state as in the composition described herein, intense agitation and heating is required. Moreover, it is highly desirable that the papers produced according to the present invention have substantially uniform brightness, opaqueness and sizing over its entire surface. Smaller particle sizes aid in the dispersibility of the particles within the slurry so that the desired characteristics are uniform throughout the paper. These smaller particle sizes may be obtained by either homogenizing the product in a high speed mixer or by rapidly cooling the composition from the high temperature at which the reaction product is formed as described herein.

A preferred surfactant used in the present invention is an ethoxylated surfactant such as POE (15) tallow amine. The surfactant further contributes to the desired dispersability of the reaction product in the water emulsion. If the mount of surfactant added is excessive, the sizing capability of the composition will be adversely affected. In the absence of a surfactant, the paper may be of a poor quality due to the decreased dispersibility of the composition, which results in spots or specks on the paper indicating a lack of dispersibility. The surfactant which is added to the composition can be any of the fatty amine ethylene oxide adducts available commercially, including tallow amine with between 2 moles to 25 moles of ethylene oxide, stearyl amine with 2 to 25 moles of ethylene oxide and coconut amine with 2 to 25 moles of ethylene oxide. The surfactant can be combinations of any of the above or mixtures of the above with nonionic surfactants. To prepare the emulsion a kettle equipped with an agitator and thermometer is charged with water followed by acid, surfactant, and salt. The reaction product is charged next. The mixture is heated to 75° C. to 98° C. and held for 30 minutes. The milky emulsion is cooled and the pH and solids are checked.

This composition has been found to impart increased opacity to the resultant paper with an improved brightness and strength in the paper produced. The composition is generally added to the pulp of cellulose fibers at a level of 0.05% to 5% by weight d/d (dry on dry), preferably 0.1 to 2% by weight d/d on the cellulose fiber.

The make-up of the composition may be varied depending on the origin of cellulose fibers from which the pulp slurry is made. In addition, the use of pulp which has been recycled from papers may require other adjustments to the composition, particularly when the recycled pulp is dark or otherwise discolored. All such adjustments to the composition may be made by one of ordinary skill in the art according to the invention disclosed herein.

The pulp to which the composition is added is made into a slurry using conventional techniques. The pulp may be bleached to remove unwanted pollutants such as lignins and de-inked if pulp made from recycled paper is used. The slurry is stored in holding tanks or fed to a papermaking machine, such as a Fourdfinier machine, in a conventional manner. The papermaking composition disclosed herein may be added either to the slurry when it is in the holding tank or may be added to the slurry as it moves along to the headbox of the papermaking machine. Preferably, the composition is applied onto the flowing pulp as it travels to the headbox.

When the slurry containing the composition reaches the headbox of the papermaking machine, paper is formed therefrom using conventional papermaking techniques and materials. The paper produced according to the present invention exhibits excellent characteristics of opaqueness, with an improved brightness and strength in the paper produced. Moreover, the addition of the composition to the pulp slurry does not cause substantial negative effects on the slurry's movement through the papermaking process.

In a further embodiment of the present invention, other materials may be added in conjunction with the composition. For instance, the invention composition may be in addition to the kaolin clay so that the paper made therefrom exhibits increased opaqueness, and improved lubricity. Other additives which are well known in the an may also be added in conjunction with the composition disclosed herein.

The composition preferably contains a weak acid to adjust the pH. The acid maintains an acidic pH preferably within the range of from about 3 to about 6. The acid acts as an aid to disperse the composition. Weak organic acids such as acetic acid or formic acid are especially preferred in the composition. Strong acids, of course, may be used to control the pH, but corrosion and safety considerations may restrict their use.

Preferably, a viscosity controlling agent such as a salt is added during production of the papermaking composition. Generally, the sodium salts and chloride salts are known viscosity controlling agents including sodium acetate, potassium acetate, sodium propionate, potassium propionate, sodium chloride, and potassium chloride. Preferred salts include sodium acetate and sodium chloride. This component acts to reduce viscosity. The composition may further comprise a defoamer to control foam, and a biocide to control bacterial growth.

The present invention may be better understood by reference to the following examples.

EXAMPLE I

To a reaction flask 428 grams (0.71 moles) of a stearic acid diamide of amino ethyl ethanol amine base (acid value 3.5 mg of KOH/gm of sample and amine number 44.0 mg of KOH/gm of sample) was added. The solid material was heated to 75° C. and held until the material was molten. To the molten base 43 grams of 84% acetic acid was charged over ten minute period. The temperature rose 3° C. during the charge. The neutralized base was held for twenty minutes. The temperature was increased to 80° C. and thirty grams (0.23 moles) of 40% glyoxal was charged over a thirty minute period. The batch was held for 30 minutes at 80° C. After the thirty minute hold the batch was poured up. The light tan solid melted at 63° C.

Thirty three grams of the cooled material was charged to an emulsion kettle. The emulsion kettle contained 266 grams of water. 0.8 grams of tallow amine (with 20 moles ethylene oxide) and 0.8 grams of sodium acetate. The emulsion was heated to 93° C. and held for 45 minutes. After the forty five minute hold period cooling was applied and the pH was adjusted to 4, and the solids were adjusted to 11% N.V.S.

EXAMPLE II

To a reaction vessel equipped with an agitator and nitrogen gas sparge, 373 grams (0.62 moles) of a stearic acid diamide of amino ethyl ethanol amine base is charged. The base has an acid number of 4.0 mg KOH/gram of sample, and an amine number of 20 mg of KOH/gram of sample. The base is heated to 88° C. and held at 88° C. until the solid is liquid. To the molten base 37 grams of 84% acetic acid is charged over 8 minute period. The batch is held fifteen minutes at 88° C. After the hold period 90 grams (0.62 moles) of glyoxal is added over a ten minute period while maintaining the temperature at 88° C. The batch is held for thirty minutes at 88° C. then poured up into a suitable container. The light tan colored solid melted at 68° C.

Thirty three grams of the reaction product was emulsified using the emulsion procedure in Example I.

EXAMPLE III

The emulsions prepared in Examples I and II were then tested by addition to wood pulp at a level of 26 pounds of emulsion per ton of paper. The pulp slurry was added to a lab headbox and drained. The wet sheet on the formation wire was dried at 250° F. for 3 minutes. The hand sheets were tested as follows: T-452 brightness and T-519 opacity were measured on a Technobrite instrument with the average of five readings being taken; and the Mullen-Burst test measuring strength were run according to TAPPI standard T403 OM-85. The retention aid utilized was Vining's Profloc 1740 (a cationic polyacrylamide). The control was an emulsion containing the stearic acid diamide of amino ethyl ethanol amine without the addition of glyoxal.

|  | Blank | A | B | C |
| --- | --- | --- | --- | --- |
| Wood Pulp (gms) | 60 | 60 | 60 | 60 |
| Retention Aid (gms) | 0.5 | 0.5 | 0.5 | 0.5 |
| Example I (gms) | — | 8.0 | — | — |
| Example II (gms) | — | — | 8.0 | — |
| Control (gms) | — | — | — | 8.0 |
| Test Results | | | | |
| Brightness | 54.8 | 57.3 | 57.5 | 56.3 |
| Opacity | 95.8 | 96.7 | 96.6 | 96.6 |
| Mullen-Burst | 8.6 | 5.7 | 5.5 | 5.0 |

As can be seen by these results the Example I and II samples show an increase in brightness over both the control and the blank paper. The Example I and II samples also show an increase in strength (Mullen-Burst) over the control.

EXAMPLE IV

To a reaction flask is added 413 grams of a stearic acid diamide of amino ethyl ethanol amine base (acid number 4.0 mg KOH/gm of sample and number 43 mg KOH/gram of sample). The base is heated to 89° C. and held at 89° C. until the base is liquid. To this base 60 grams of 84% acetic acid is added over a 15 minute period and held at 89° C. for 10 minutes. Then 46 grams of Sequex R (45% glyoxal condensation product, a 1:2 molar ratio of cyclic urea to glyoxal from Sequa Chemicals, Inc.) is added over a 13 minute period. The batch is held at 89° C. for forty five minutes. After the hold period the product is poured into a suitable container and allowed to cool to room temperature. The dark brown solid had a melting point of 68° C. To an emulsion kettle is added 33 grams of the base thus prepared. To the base 265 grams of water, 0.8 grams of TAM 15 POE and 0.8 grams of sodium acetate. The mixture is agitated and heated to 92° C. and held for 38 minutes to insure emulsification. The milky white emulsion is adjusted to a pH of 4.3 and 11% non volatile solids. The emulsion is cooled to 35° C. and poured into a suitable container.

EXAMPLE V

The reaction procedure as described in Example IV is used with the following charges: 378 grams of a stearic acid diamide of amino ethyl ethanol amine base (acid number 3.5 mg of KOH/gram of sample, and amine number 42 mg of KOH/gram of sample); 38 grams of 84% acetic acid: and 84 grams of Sequex R.

The sample was emulsified using the procedure described in Example IV.

EXAMPLE VI

The emulsions prepared in Examples IV and V were then tested as described in Example III with the following results.

|  | Blank | A | B | C |
| --- | --- | --- | --- | --- |
| Paper Pulp (gms) | 60 | 60 | 60 | 60 |
| Retention Aid (gms) | 0.5 | 0.5 | 0.5 | 0.5 |
| Example IV (gms) | — | 8.0 | — | — |
| Example V (gms) | — | — | 8.0 | — |
| Control (gms) | — | — | — | 8.0 |
| Test Results | | | | |
| Brightness | 54.8 | 57.2 | 56.7 | 56.3 |
| Opacity | 95.8 | 97.0 | 96.3 | 96.8 |
| Mullen-Burst | 8.6 | 6.1 | 5.4 | 5.0 |

The results show that the Example IV and V samples provide a definite increase in brightness over the control and blank sheet of paper while maintaining the same opacity as the control. The strength (Mullen-Burst) is also higher than the control.

EXAMPLE VII

Glyoxal was added to the stearic acid diamide of amino ethyl ethanol amine base at two different steps in the process. The first addition point was to add the glyoxal to the kettle in the emulsion preparation, then heat the mixture to 95° C. and hold for 30 minutes to react the glyoxal with the reaction product base. The second addition point was to prepare the emulsion as usual and add the glyoxal at the end to the cooled emulsion.

The following samples were evaluated.

| Sample | Components |
| --- | --- |
| A | 4.5% of 40% glyoxal added in emulsion preparation and heated |
| B | Control made from same emulsified reaction product base as other samples but without glyoxal |
| C | 7.8% of 40% glyoxal added in emulsion preparation and heated |
| D | 4.5% of 40% glyoxal post added to cooled emulsion |
| E | 7.8% of 40% glyoxal post added to cooled emulsion |
| F | 4.5% of 40% glyoxal added to reaction product base salt and then heated at 95° C. for 30 minutes, then emulsified |

The emulsions were added to a slurry of Bowater's pulp and Vining's Profloc (retention aid), then this slurry was added to a hand sheet mold to prepare two gram handsheets. These two gram handsheets were dried and conditioned, then tested for brightness, opacity, tensile and Mullen burst. The following table shows the results from this testing:

|  | Results | | | |
| --- | --- | --- | --- | --- |
|  | Brightness | Opacity | Tensile | Mullins |
| Pulp | 60.88 | 90.71 | 4.31 | 11.31 |
| A | 62.82 | 91.82 | 3.70 | 9.15 |
| B (control) | 62.29 | 91.71 | 3.74 | 7.97 |
| C | 62.75 | 91.63 | 3.59 | 9.20 |
| D | 62.91 | 92.16 | 3.80 | 8.57 |
| E | 62.90 | 92.14 | 3.27 | 8.79 |
| F | 62.99 | 92.40 | 3.56 | 9.62 |

The samples with glyoxal are 0.5 units brighter than the control (Sample B). Samples F, D and E were the brightest samples with a value of 62.9. Samples D and E were made with a post addition of glyoxal to the cooled emulsion.

Pre-charging the glyoxal and heating to react the glyoxal affects the opacity with both samples A and C having lower opacity values. Reacting the glyoxal with the reaction product base acetate salt (Sample F) resulted in the highest opacity values.

Tensile values of the samples did not distinguish between addition points. The tensile values ranged from a low of 3.27 to a high of 3.80. The control, Sample B, had a value of 3.74 which is in the range mentioned above. The virgin fiber had a tensile value of 4.31.

Mullen burst showed a difference between glyoxal addition points. Adding the glyoxal before the emulsion was heated to 90° C. gave higher values than post adding the glyoxal to the cooled emulsion. The highest values were recorded by Sample F which is the sample where the glyoxal is reacting with the reaction product base acetate salt.

Glyoxal can thus be added to the reaction product to increase the brightness values and Mullen burst while not adversely affecting the opacity.

What is claimed is:

1. A method of producing a paper with enhanced opacity comprising the steps of:

providing a pulp slurry of cellulose fibers;

adding to said slurry a composition comprising the reaction products formed from the reaction of fatty acid and diamine, to which is added a glyoxal compound and wherein said composition further includes a surfactant; and forming said slurry into said paper.

2. Method of claim 1 wherein 70 to 90% by weight of said fatty acid and 10 to 30% by weight of said alkanoldiamine are added.

3. Method of claim 1 wherein the diamine is an alkanoldiamine.

4. Method of claim 2 wherein the alkanoldiamine is amino ethyl ethanol amine.

5. Method of claim 3 wherein the fatty acid has a carbon chain length of $C_{12}$ to $C_{18}$.

6. Method of claim 5 wherein the fatty acid is stearic acid.

7. Method of claim 1 wherein the reaction products are further reacted with additional glyoxal compound.

8. Method of claim 7 further comprising adding an additional acid to obtain a pH of the composition of about 4 to 8 after reaction of the fatty acid with diamine, but prior to reaction of the glyoxal compound.

9. Method of claim 8 further comprising adding a salt as a viscosity controlling agent.

10. Method of claim 7 wherein the glyoxal compound is added at a level of 3 to 35% by weight of the reaction products.

11. Method of claim 10 wherein the glyoxal compound is selected from the group consisting of glyoxal cyclic urea/glyoxal/polyol condensate, polyol/glyoxal condensate, urea/glyoxal condensate and glycol/glyoxal condensate.

12. Method of claim 10 wherein the glyoxal compound is glyoxal is added.

13. In a paper product made from cellulose fibers, the improvement comprising an opacity enhancing composition therein comprising the reaction products formed from the reaction of fatty acid and diamine, to which is added a glyoxal compound and wherein said composition further includes a surfactant.

14. The paper product of claim 13 wherein the diamine is an alkanoldiamine.

15. The paper product of claim 14 wherein the alkanoldiamine is amino ethyl ethanol amine.

16. The paper product of claim 14 wherein the fatty acid has a carbon chain length of $C_{12}$ to $C_{18}$.

17. The paper product of claim 16 wherein the fatty acid is stearic acid.

18. The paper product of claim 16 wherein 70 to 90% by weight of said fatty acid, and 10 to 30% by weight of said alkanoldiamine is added.

19. The paper product of claim 13 wherein the reaction products are further reacted with the glyoxal compound.

20. The paper products of claim 19 wherein the glyoxal compound is added at a level of 3 to 35% by weight of the reaction product.

21. The paper product of claim 20 wherein the glyoxal compound is selected from the group consisting of glyoxal, cyclic urea/glyoxal/polyol condensate, polyol/glyoxal condensate, urea/glyoxal condensate and glycol/glyoxal condensate.

22. The paper product of claim 20 wherein the glyoxal compound is glyoxal.

23. The paper product of claim 20 wherein an additional acid is added to obtain a pH of the composition of about 4 to 8 after reaction of the fatty acid with diamine, but prior to the reaction of the glyoxal compound.

24. The paper product of claim 23 wherein a salt is added as a viscosity controlling agent.

* * * * *